Nov. 12, 1940.   T. W. THIRLWELL   2,221,276
DIRECTION INDICATOR SWITCH
Filed April 5, 1937
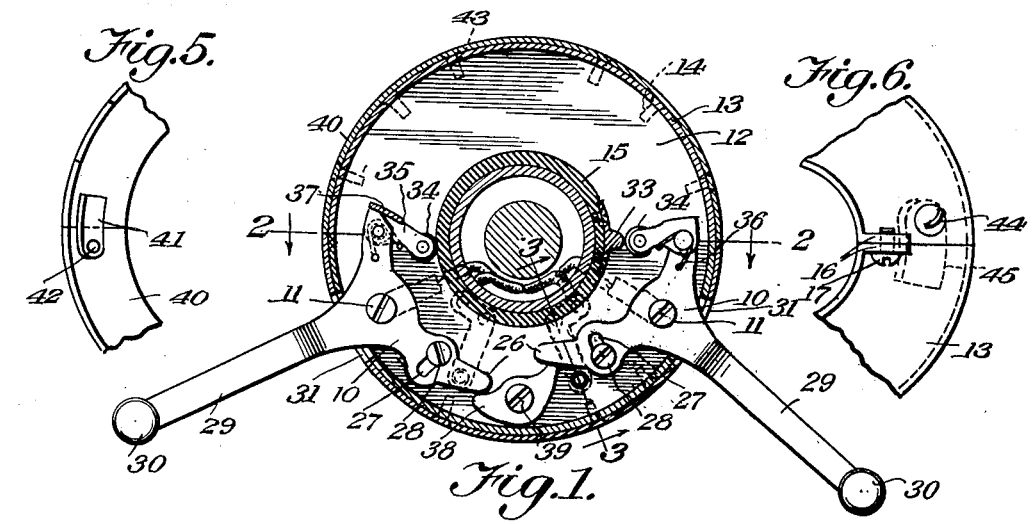
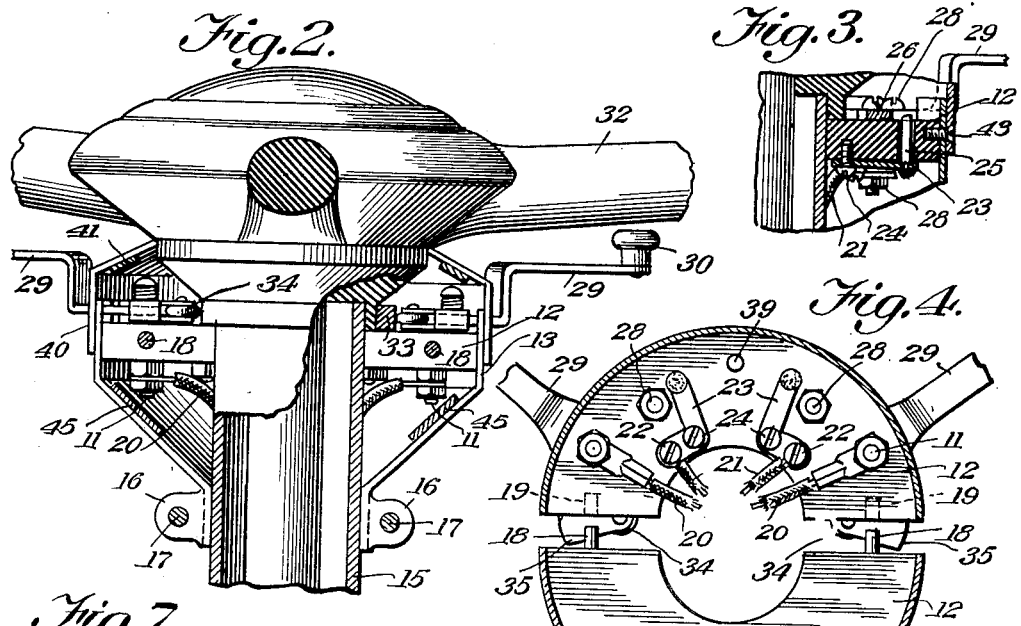
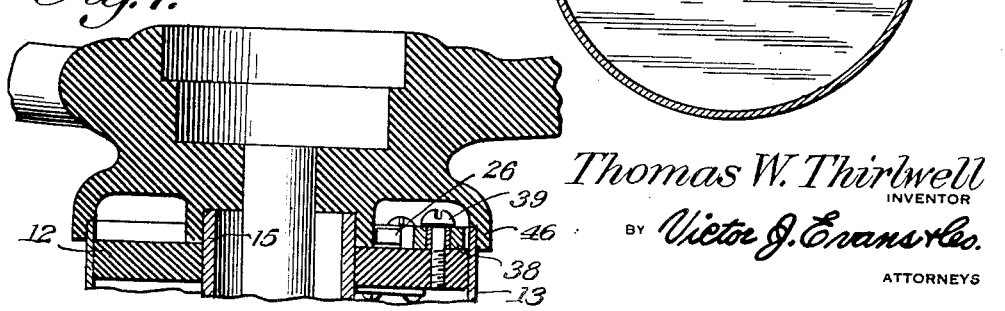
Thomas W. Thirlwell
INVENTOR
BY Victor J. Evans & Co.
ATTORNEYS Patented Nov. 12, 1940

2,221,276

UNITED STATES PATENT OFFICE 2,221,276

DIRECTION INDICATOR SWITCH

Thomas William Thirlwell, St. Albans, W. Va.

Application April 5, 1937, Serial No. 135,157

2 Claims. (Cl. 200—59)

The object of the invention is to provide a switch for use on motor vehicles that may be readily applied to the steering column of the same with practically no change or modification of the particular parts of the vehicle in its application; to provide a switch of the kind indicated which may be readily dismantled for repair or inspection of its parts; to provide a switch comprising multiple control elements in which only one can be operated at a time, so that there may be no conflict in giving signals; and generally to provide a switch of the kind indicated which is of simple form and susceptible of cheap manufacture.

With this object in view, the invention consists in a construction and combination of parts of which a preferred embodiment is illustrated in the accompanying drawing but to which the invention is not to be restricted. Certain changes and modifications may be found necessary in continued use in practice and these the right is claimed to make in so far as they may be comprehended by the annexed claims.

In the drawing:

Figure 1 is a horizontal sectional view through the switch case or housing just above the plane of the movable switch elements.

Figure 2 is a sectional view on the plane indicated by the line 2—2 of Figure 1.

Figure 3 is a sectional view on the plane indicated by the line 3—3 of Figure 1.

Figure 4 is a bottom plan view of the contact shelf or platform, showing the sections thereof separated and the housing wall in sections.

Figure 5 is a detail bottom plan view of a portion of the cap member illustrating the means by which the sections of the cap member are secured together.

Figure 6 is a detail bottom plan view of a portion of the housing illustrating the means for securing the two sections thereof together.

Figure 7 is a view similar to Figure 2 but illustrating a modification to be employed when the invention is manufactured as a part of the vehicle.

The movable members or switch elements 10 are pivotally mounted, by means of bolts 11, on the platform or shelf 12 which is carried by the housing or case 13 in which it is secured by means of the screws 14.

The case or housing 13 is sectional, being composed of two halves, as is also the shelf or platform 12, so that the two sections may be separated for mounting on the steering column 15 in surrounding relation to which they are arranged with the steering column passing through the center openings formed jointly in the two sections of the platform 12 and in the bottom of the case 13.

Where it supports the shelf, the case 13 is cylindrical. Similarly it is cylindrical where it engages the steering column but since the shelf supporting section is of a materially greater diameter than the steering column, the case is progressively reduced in diameter from the shelf supporting section or portion to the column engaged portion, the two sections at the latter portion being provided with ears 16 through which bolts 17 are passed to contract the column engaging portion into firm engagement with the steering column to support the case in position thereon.

The two sections of the shelf 12 are provided one with the dowels 18 and the other with the sockets 19 which the dowels enter when the sections of the case and shelf are assembled.

The switch elements are confined to one section of the shelf but the latter is made in the two section form to give the whole structure rigidity in use.

The bolts 11 by which the switch levers or members 10 are mounted constitute also binding posts for the leads 20 which lead to a source of supply. The return leads 21 are connected to binding posts 22 which form lateral extensions or flat spring members 23 secured on the underface of the shelf 12 by means of screws 24. At the ends remote from the binding posts 22, the spring members 23 connect with pins 25 which are loosely mounted in holes formed in the platform or shelf, so that the upper ends of the pins may protrude through the upper face of the shelf to be engaged with the tongues 26 formed as terminals of the switch members 10.

In some instances, the binding posts 22 may be connected with a common return lead but the present invention is designed for use in connection with flashers, so that the two switch circuits are kept separate.

As one tongue 26 or the other, engages its respective contact pin 25, as it will when the switch member is rocked, the pin may be depressed, the spring mounting 23 yielding, since it is supported at a point remote from its point of connection with the pin.

In order to insure firm contact between the switch member or lever 10 with its attendant pin 25, each switch member is formed with an arcuate slot 27 generated on an arc having its center at the axis of the bolt 11. Guide bolts 28, mounted in the platform or shelf 12, pass through the slots 27 and the heads of the bolt preclude the switch levers yielding upwardly, while the bolts limit the angular movement of the levers by abutting the ends of the slots when the levers are rocked.

The levers or members 10 are manually actuated by means of hand levers 29 formed with terminal handles 30, these levers being exteriorly exposed by reason of extending through clearance slots 31 in the housing or case 13. While the levers 29 are primarily to move the switch levers into circuit closing position, they may be obviously used to move them out of circuit closing position, but the invention contemplates circuit opening movement being accomplished by the steering wheel 32, as it is rotated, the hub of the steering wheel being equipped with a kick-off cam 33 for engagement with the rolls 34 carried by kick-off levers 35 of the same general construction as those shown in Patent No. 2,038,456. The kick-off levers are pivotally mounted on the switch members 10 at the ends remote from the tongues 26 and are spring impelled, as indicated at 36, toward the kick-off cam, being limited in such movement by the webs 37 which engage the edges of the switch levers. The kick-off levers may yield in the opposite direction under the pressure of the springs, so that in one direction of movement of the cam, there will be no movement imparted to the switch levers, whereas in the other direction of movement of the cam, the switch levers will be shifted. For example, if the steering wheel be rotating in a left hand direction and the switch lever 10, as viewed in Figure 1, be engaged with its pin 25, the kick-off lever 35 of that lever will yield toward the switch lever as it is engaged by the cam. When the steering wheel is turned right handedly, however, the cam will move in the opposite direction and in order for it to pass the roll 34, the switch lever must then yield which will of course disengage it from its contact pin 25. Thus, the left hand switch lever will be moved to circuit closing position to signal for a left hand turn and as the steering wheel is turned left handedly to accomplish the turn of the vehicle, the cam will pass the switch lever arm without effecting switch opening movement. If the vehicle steering wheel is turned in the opposite direction to direct the vehicle on a straight course, the cam will then effect switch opening movement by shifting the switch lever.

In order that the two switch members may not be in circuit closing position simultaneously, there is provided a rocker block 38 pivotally mounted on a screw 39 carried by the platform or shelf 12. The extremities of the rocker block are in the path of movement of the tongues 26, so that the block is rocked when one switch lever is shifted into circuit closing position to rock the other lever out of circuit closing position should it have been in such at the time the first switch lever is operated. The rocker block thus provides means precluding simultaneous circuit closing position of the two levers.

Where the switch is employed as equipment on conventional vehicles, the case 13 is closed by means of a cap member 40 consisting of two sections of which one is provided with ears 41 overlapping the other section to be engaged by screws 42. Screws 43 serve as a means for securing the cap member in place. The two sections of the case are similarly secured together by means of screws 44 passed through the wall of one section to thread into ears 45 mounted on the other section by overlapping the first section.

Where the switch is employed as equipment for vehicles in their manufacture, the cap member is omitted and the steering wheel has its hub portion formed with an annular skirt 46 overhanging the upper edge of the case.

The invention having been described, what is claimed as new and useful is:

1. A device of the kind indicated comprising a case, a platform mounted in the case, switch levers pivotally mounted on the platform, fixed contacts engageable by the switch levers, the latter being provided with pivotally mounted kick-off levers having a limited movement in one direction, a steering wheel actuated cam engageable with the kick-off levers, and means operatively connecting the switch levers to positively shift the one into circuit opening position when the other is shifted into circuit closing position, the kick-off levers being shifted into the path of movement of the cam when the switch levers are moved into circuit closing position.

2. A device of the kind indicated comprising a case, a platform mounted in the case, switch levers pivotally mounted on the platform, fixed contacts engageable by the switch levers, the latter being provided with pivotally mounted kick-off levers having a limited movement in one direction, a steering wheel actuated cam engageable with the kick-off levers, a rocker block having a pivotal mounting on the platform intermediate the pivotal mountings of the switch levers, the rocker block having its extremities engaged with extremities of the switch levers to positively rock one away from its contact engaging position when the other is rocked towards its contact engaging position.

THOMAS WILLIAM THIRLWELL.